March 20, 1945. W. H. FORMHALS 2,372,075

SATURATION SCHEME FOR DIRECT CURRENT GENERATORS

Filed Dec. 3, 1941

WITNESSES:
Wm. B. Sellers.
Nw. C. Groove

INVENTOR
William H. Formhals.
BY
Paul C. Friedemann
ATTORNEY

Patented Mar. 20, 1945

2,372,075

UNITED STATES PATENT OFFICE 2,372,075

SATURATION SCHEME FOR DIRECT CURRENT GENERATORS

William H. Formhals, Forest Hills, Pa., assignor to Westinghouse Electric & Manufacturing Company, East Pittsburgh, Pa., a corporation of Pennsylvania Application December 3, 1941, Serial No. 421,424

7 Claims. (Cl. 171—312)

My invention relates to dynamo-electric machines, and more particularly to their construction and the control thereof.

My invention, in addition to providing a special novel construction and theory of operation of a dynamo-electric machine, embodies improvements over the subject matter disclosed and claimed in the George E. King Patent No. 2,205,-204, issued June 18, 1940, and entitled Variable voltage motor control.

In a Ward-Leonard type variable voltage drive the speed of a motor is varied by varying the voltage of the generator supplying the electrical energy to the motor. The motor is ordinarily provided with a separately excited field winding and for a reversing motor the desired direction of rotation of the motor is obtained by reversing the polarity of the energy supplied to the motor armature.

Apparatus is well known for compensating in the generator for the IR drop in: the generator armature circuit; the motor armature circuit; such generator series field windings as may be used; and the leads interconnecting the motor and the generator.

The generator is provided with a separately excited main field winding, the current through which is arranged to be controlled and reversed in order to operate the motor and the load attached thereto, for example, a planer platen, at various speeds in either direction of travel. The excitation of the main field winding of the generator may be controlled by means of a rheostat or the combination of various resistors and suitable control devices for inserting various steps of resistance in circuit with the main field winding. For each position of the controller controlling the field current in the generator, there is a particular speed of operation of the motor and thus the load, as a planer platen, that is desired. Any departure from the desired speed value introduces undesirable operation of the load. If it were possible by any practical means to maintain all of the conditions affecting such a control constant, the desired operation could be secured with the simple conventional variable-voltage control just briefly explained.

Since it is manifestly nigh impossible to maintain all the conditions affecting a variable-voltage control constant, I use, with such a control, a regulator-generator having a series field winding 14 and a field winding 15 arranged to be responsive to the voltage applied to the motor. These field windings are differentially related to each other and are so disposed with reference to each other that the regulator-generator, in operation, generates a voltage which is a function of the speed of the motor and the load carried by the motor. Differential field windings 16 and 17 are also provided on the regulator-generator and are connected, respectively, in series circuit relation with the main field windings 5 and 6 of the generator G of the control system, for opposing the combined action of the series and shunt field windings 14 and 15. The armature 8 of the regulator-generator is arranged to be connected in circuit relation with these regulator-generator differential field windings 16 and 17 and the field windings 5 and 6 of the generator of the control system and to the controller. The controller, represented schematically by rheostats 11 and 11' and leads 10 and 10' may be operated to independently vary the flow of current through the main generator field windings.

By proper selection of the electrical characteristics and constants of the electrical units included with my system of control, and by a selection of a particular interconnection of the electrical units and by making some minor compromises, the proper functioning can be secured, that is, the motor speed can be made to be proportional to the setting of the leads 10 and 10' of the controller regardless of: changes in ambient temperature; variations in the load on the motor; direction of operation of the motor; rapidly of the voltage reversal on the motor terminals; the voltage of the regulator generator during reversal of its polarity; and regardless of the many other factors that would ordinarily prevent the desired operation of the motor.

Further, I have discovered that by a proper selection of the constants and magnetic characteristics of the electrical units of a Wheatstone bridge, including the main field windings 5 and 6 of the main generator G, the differential field windings 16 and 17 of the regulator-generator R, the armature 8 of the regulator-generator R and the resistors and other elements used, that the control effect of the regulator can be made much faster and can be made substantially independent of the shape and slope of the curve indicating its saturation characteristics. Still other advantages may be obtained, which advantages will become more apparent from a study of the objects of my invention hereinafter stated and from the claims hereto appended.

A broad object of my invention is to provide a system of control for varying the voltage impressed on the terminals of a direct current motor in such manner that the speed selected for the motor by the control is attained in a relatively short time interval and is substantially independent of: the load on the motor; the direction of rotation of the motor; the effect of the residual magnetism of the regulator-generator and any of the other factors that would ordinarily prevent operation of the motor at the speed selected for it.

Another object of my invention is to eliminate the undesirable effect of the residual magnetism of the regulator-generator in a variable voltage drive.

It is also an object of my invention to provide a generator with a low residual magnetism to thus require a low coercive force to reversal of its polarity as the polarity of energization of the generator fields is reversed.

Other objects of my invention will become more apparent from a study of the following specification and the accompanying drawing, in which.

Figure 1:
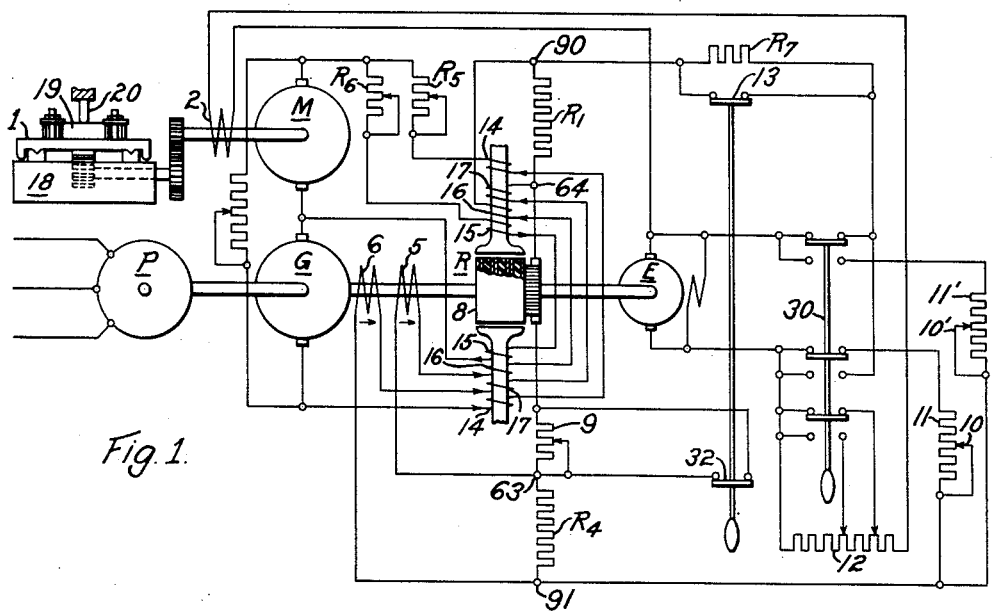
Figure 1 is a diagrammatic showing of my invention as applied to a variable voltage drive such as is disclosed and claimed in the above-mentioned King patent.

In the design of rotating regulator generators, it is frequently necessary to limit the maximum amount of regulating or correcting power output. Since such a regulator is, as shown in Fig. 1, usually connected to a field circuit of a machine, the characteristics of which are to be closely maintained; and since the field circuit (or circuits) is of constant or practically constant resistance, the power output can be limited by limiting the voltage output of the regulating generator.

In the design of ordinary generators, it has been common practice to limit the voltage of the generator by introducing saturation in the magnetic circuit by notching or decreasing the cross-sectional area of the poles. This decrease in cross-sectional area causes, after a certain amount of flux passes through the area, very large magnetomotive force drops across the poles thus making small increases in flux for very large increases in magnetomotive force after this point of saturation.

As a result of this large magnetomotive force drop across the poles of these generators, there remains a very high residual flux when excitation is removed. Or, to express this in another way, a very high coercive force is required to bring the flux to zero.

This latter fact prohibits the use of such a method of introducing saturation in the case of a regulating generator because for its satisfactory operation it is necessary that the magnetic circuit have a very low coercive force, since the regulator generator must operate with both polarities of voltage, and, to give satisfactory regulating results, must, for a given magnetomotive force, always repeat the same value of voltage.

A low coercive force is very desirable because a great deal of the time a regulating generator is called upon to operate at or near zero magnetomotive force, and for good regulating characteristics the response should be linear with respect to the magnetomotive force.

I have invented a generator construction by means of which I introduce a saturation limit in the generator without requiring this high coercive force to reverse its polarity. I am thus able to build a much more satisfactory regulating generator, and thus materially improve the operation of a variable voltage drive. I show my novel combination and the novel generator schematically in Fig. 1. The details of my novel generator are shown, in two forms, in Figs. 2 and 3.

Figure 2:
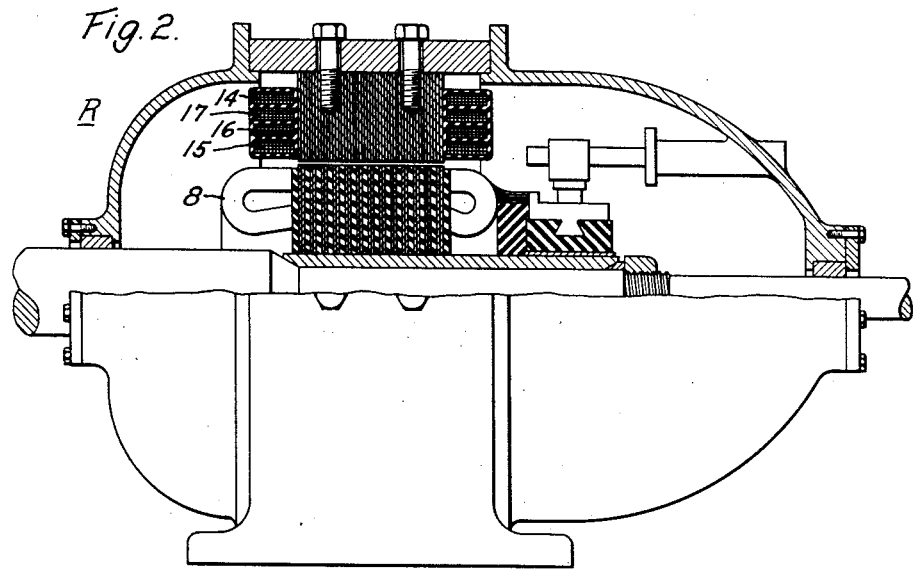
Fig. 2 shows a preferred embodiment of my special type of generator.

In Fig. 2, I show a generator having conventional mechanical stator construction, that is, the poles are the same as may be found in conventional generators. On the pole pieces I dispose the field windings 14, 15, 16, and 17, or, if the generator is to be used in control combinations other than shown in Fig. 1, one or more field windings. The rotor, as shown in Fig. 2, has the appearance of a conventional rotor and the armature windings on the rotor are actually conventional windings, but the structural, or mechanical portion of the armature I construct of alternate laminations of iron and laminations of some nonmagnetic material as paper, Micarta, rubber, or some other suitable material.

The iron laminations are conventional as some silicon iron is extensively used for electrical machinery.

In the preferred arrangement as shown in Fig. 2, I show one alternate lamination of non-magnetic material and of a given thickness and two conventional iron laminations whose combined thickness is about equal to the thickness of the single non-magnetic lamination.

This construction reduces the volume of iron in the rotor or armature and thus puts the saturation in the armature. In a generator so constructed, the magnetomotive force required for the armature rapidly increases after a certain value of flux is obtained and thus the voltage output of the machine above that point will remain essentially constant.

The armature will, of course, have a tendency to retain a high residual flux or to have a high coercive force, but this will have no effect upon the output voltage because the armature conductors do not cut this residual flux. Also, since the magnetomotive force of the circuit does not change instantaneously, the iron of the armature because of its rotation as the field decreases passes through a decreasing field of reversing polarity and the armature is, therefore, demagnetized.

Figure 3:
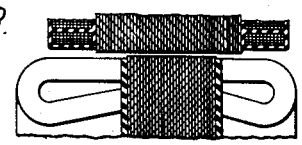
Fig. 3 is a modification of my special type of generator.

In the modification shown in Fig. 3, I do not use non-magnetic laminations in the armature in alternate relation with magnetic laminations but instead I use a shorter effective armature to thus reduce the amount of iron in the armature. The saturation for this type of construction will also be in the armature long before the pole pieces could get saturated. The novel results obtained with the construction of Fig. 2 will thus also be obtained for the modification shown in Fig. 3. There might be somewhat greater flux leakage for the showing in Fig. 3 than for the construction shown in Fig. 2, but not sufficient to impair or materially alter the novel results of my invention. To give the armature conventional appearance in Fig. 3, the non-magnetic laminations may be positioned at each side of the central iron laminations.

My novel generator produces especially useful results in a variable voltage drive as shown in Fig. 1. As shown in Fig. 1, the regulator-generator R is the one having the novel rotor construction and is provided with a main or shunt field winding 15, a pair of differential field windings 16 and 17 and a series field winding 14. As indicated by the arrows adjacent these mentioned field windings, differential field windings 16 and 17 and the series field winding 14 are so wound on the pole pieces of the regulator-generator R that they produce magnetomotive forces in the same direction, but opposite to the direction of the magnetomotive force produced by the main or shunt field winding 15.

The motor M is provided with field windings 2 disposed to be energized from exciter E through a suitable rheostat 12. The generator G has the two main field windings 5 and 6 suitably controlled by control leads 10 and 10', the regulator generator R, and a Wheatstone bridge circuit as pointed out hereinafter.

In Fig. 1, the motor load is represented by a reversing planer 18 having the platen 1 upon which is mounted a workpiece 19 operated upon by the cutting tool 20. The reversing operation of the platen is controlled by the platen itself. In a control including all the details the arrangement is such that once the equipment is in operation, the platen 1 by suitable means automatically operates reversing switch 30 first to one position and then to the other position.

It is desirable to independently control the flow of current through the main field windings 5 and 6 of the generator G from two sources, one of the sources comprising the exciter E across the armature terminals of which the rheostat 11 and the Wheatstone bridge are connected, and the other source comprising the armature 8 of the regulator-generator. For this purpose, I provide, as already suggested, a Wheatstone bridge circuit comprising the customary four legs or branches, two of which include the resistors R1 and R4 and the other two branches comprise, one of them, the differential field winding 16 of the regulator-generator R and field winding 5 of the main generator, and the field winding 6 of the main generator G and differential field winding 17 of the regulator-generator R.

The armature 8 of the regulator-generator may have its terminals connected to two of the opposite terminals 63 and 64 of the Wheatstone bridge either through resistor 9 or switch 32. The other two opposite terminals 90 and 91 of the Wheatstone bridge may be connected, either through the contact members 13 or resistor R7, and rheostate 11 and certain switches of the directional contactor 30 to the exciter E. The series field winding 14 of the regulator-generator R is connected, as illustrated, in series with an adjustable resistor R5 across the armature terminals of the motor M. The resistor R6 is used to reduce the heat loss in the shunt field winding 15 and in consequence reduces to a minimum any change in resistance of the field winding 15 by reason of temperature changes.

In operation when motor P is operating switch 30 will be reciprocated to take either one of the two positions for this switch. The exciter E will supply excitation for itself, the generator G, the motor M and the regulator generator R. The polarity of the generator R will be determined by the relative effect of the field windings 14, 15, 16 and 17. Since the requirements of the regulator generator R are that a smooth regulating effect be produced from one polarity right down to zero voltage and again for opposite polarity, it is essential that the coercive force be a minimum. This I accomplish by my special generator armature construction as already explained. I, therefore, also provide a novel variable voltage drive of utility for reversing planers, draw-out shapers, or any other variable voltage drive requiring accurate regulation of the motor speed to fit the speed setting of the controller, as leads 10 and and 10' in my shown control.

I am, of course, aware that others, particularly after they have had the benefit of the teachings of my invention, may devise other systems of control using my special generator or other generators having the novel characteristics I disclose. I, therefore, do not wish to be limited to the particular showing made but wish to be limited only by the scope of the claims hereto appended.

I claim as my invention:

1. In a dynamo-electric machine to be used in a system of control, in combination, pole pieces on said machine having a given effective area for carrying magnetic flux, an armature structure having an effective area for carrying magnetic flux less than the said given effective area for carrying magnetic flux in the pole pieces, electric windings on the pole pieces, means for varying the excitation of the windings on the pole pieces from a given value in one direction short of saturation of the pole pieces but sufficient to saturate the armature structure to a given value in the other direction short of saturation of the pole pieces but sufficient to saturate the armature structure.

2. In a dynamo-electric machine included in a system of control, the combination of pole pieces, having a given magnetic capacity, for the machine, an armature structure for said machine, said armature structure having a lesser magnetic capacity than said pole pieces, field windings for said pole pieces, part of said system of control for exciting the field windings, and means for varying the excitation whereby, as the excitation is varied, the armature structure becomes saturated before the pole pieces become saturated when the excitation is increased.

3. In electric circuit means, a dynamo-electric machine having pole pieces of greater magnetic capacity than the armature structure, and means for exciting the pole pieces at a value so that they are magnetized but not saturated but at a value sufficient to saturate the armature structure.

4. In electric circuit means, a dynamo-electric machine having an armature structure, and having conventional pole pieces having a given effective flux area adjacent the armature structure, said armature structure being built up of layers of magnetic material but insufficient in number to have substantially the same effective flux area adjacent the pole pieces as the pole pieces have adjacent the armature, and means for producing a magnetic flux in said pole pieces and armature.

5. In a regulating generator for a system of control, in combination, pole pieces having a given magnetic capacity, field windings on the pole pieces, means for varying the effective excitation of the field windings from one polarity to the opposite polarity over a range just short of saturation for each polarity, an armature structure for the generator having a lesser magnetic capacity than the pole pieces whereby the variations of the excitation of the field windings just short of saturation saturates the armature structure.

6. In a regulating generator for an electric system of control, in combination, a regulating generator having conventional laminated pole pieces of given magnetic characteristics and of a given sectional area taken normal to the pole axis, a rotor built up of laminations of the same general magnetic characteristics as the pole pieces but the number of laminations of the rotor being so chosen that the effective magnetic flux carrying area facing the pole pieces is less than said sectional area of the pole pieces, whereby the rotor structure may be saturated without saturating the pole pieces, and means, part of said system of control, for varying the flux in the pole pieces from one polarity to the opposite polarity just short of saturation of the pole pieces for each polarity, whereby the rotor becomes saturated before the flux in the pole pieces is raised to a value just short of saturation.

7. In a regulating generator for an electric system of control, in combination, a regulating generator having conventional laminated pole pieces of given magnetic characteristics and of a given sectional area taken normal to the pole axis, a rotor built up of laminations of magnetic material and laminations of non-magnetic material, the laminations of magnetic material having the same general magnetic characteristics as the laminations of the pole pieces, and the composite rotor structure, built up of the two types of laminations, giving the rotor a generally conventional appearance as to dimensions with reference to the dimensions of the pole pieces and the frame structure of the generator, and means, part of said system of control, for increasing the flux density in the pole pieces to a value just short of saturation, whereby the magnetic laminations of the rotor become saturated.

WILLIAM H. FORMHALS.